(12) United States Patent
Katz et al.

(10) Patent No.: US 8,831,289 B2
(45) Date of Patent: Sep. 9, 2014

(54) IDENTIFICATION OF OBJECTS IN A 3D VIDEO USING NON/OVER REFLECTIVE CLOTHING

(75) Inventors: Sagi Katz, Yokneam (IL); Giora Yahav, Haifa (IL)

(73) Assignee: Microsoft International Holdings B.V., Amsterdam (NL)

( * ) Notice: Subject to any disclaimer, the term of this patent is extended or adjusted under 35 U.S.C. 154(b) by 0 days.

(21) Appl. No.: 13/351,680

(22) Filed: Jan. 17, 2012

(65) Prior Publication Data

US 2012/0114180 A1    May 10, 2012

Related U.S. Application Data

(63) Continuation of application No. 12/044,981, filed on Mar. 9, 2008, now Pat. No. 8,121,351.

(51) Int. Cl.
     *G06K 9/00*      (2006.01)
     *G06T 7/00*      (2006.01)

(52) U.S. Cl.
     CPC .................................. *G06T 7/0053* (2013.01)
     USPC .......................................... 382/106; 382/209

(58) Field of Classification Search
     CPC .................... G06T 7/0051; G06T 2207/10028
     USPC .......................................... 382/106, 103, 209
     See application file for complete search history.

(56) References Cited

U.S. PATENT DOCUMENTS

| | | | |
|---|---|---|---|
| 6,091,905 A | 7/2000 | Yahav | |
| 6,100,517 A | 8/2000 | Yahav | |
| 6,297,825 B1 | 10/2001 | Madden et al. | |
| 6,639,656 B2 | 10/2003 | Ikari et al. | |
| 6,963,376 B2 | 11/2005 | Nakamura | |
| 7,003,136 B1 | 2/2006 | Harville | |
| 7,242,807 B2 * | 7/2007 | Waupotitsch et al. | 382/209 |
| 7,379,559 B2 | 5/2008 | Wallace et al. | |
| 7,385,708 B2 * | 6/2008 | Ackerman et al. | 356/603 |
| 7,512,262 B2 * | 3/2009 | Criminisi et al. | 382/154 |
| 7,747,067 B2 | 6/2010 | Popescu et al. | |
| 8,121,351 B2 * | 2/2012 | Katz et al. | 382/106 |
| 8,331,711 B2 * | 12/2012 | Gangwal et al. | 382/254 |

(Continued)

OTHER PUBLICATIONS

Ruiter et al., On-line Modeling for Real-Time, Model-Based 3D Pose Tracking [on-line], 2007 [retrieved on Jul. 26, 2013], Springer Netherlands, pp. 555-560. Retrieved from the Internet: http://link.springer.com/chapter/10.1007/978-1-4020-6264-3_96.*

(Continued)

*Primary Examiner* — Matthew Bella
*Assistant Examiner* — Dennis Rosario
(74) *Attorney, Agent, or Firm* — Rachael Vaughn; Leonard Smith; Micky Minhas

(57) ABSTRACT

A computing system generates a depth map from at least one image, detects objects in the depth map, and identifies anomalies in the objects from the depth map. Another computing system identifies at least one anomaly in an object in a depth map, and uses the anomaly to identify future occurrences of the object. A system includes a three dimensional (3D) imaging system to generate a depth map from at least one image, an object detector to detect objects within the depth map, and an anomaly detector to detect anomalies in the detected objects, wherein the anomalies are logical gaps and/or logical protrusions in the depth map.

20 Claims, 6 Drawing Sheets

(56) References Cited

U.S. PATENT DOCUMENTS

| | | | |
|---|---|---|---|
| 8,411,149 B2* | 4/2013 | Maison et al. | 348/207.1 |
| 2003/0169906 A1 | 9/2003 | Gokturk et al. | |
| 2003/0235338 A1 | 12/2003 | Dye | |
| 2004/0037450 A1* | 2/2004 | Bradski | 382/103 |
| 2007/0285419 A1 | 12/2007 | Givon | |
| 2008/0247670 A1* | 10/2008 | Tam et al. | 382/298 |
| 2009/0110292 A1 | 4/2009 | Fujimura et al. | |
| 2009/0244309 A1* | 10/2009 | Maison et al. | 348/222.1 |

OTHER PUBLICATIONS

Bowyer et al., A survey of approaches and challenges in 3D and multi-modal 3D + 2D face recognition [on-line], Jan. 2006 [retrieved on Jul. 26, 2013], Computer Vision and Image Understanding, vol. 101, Issue 1, pp. 1-15. Retrieved from the Internet: http://www.sciencedirect.com/science/article/pii/S1077314205000822.*

Bowyer et al., A survey of 3D and Multi-Modal 3D+2D Face Recognition, Technical Report TR 2004-22 [>serial<on-line], [retrieved on Jul. 26, 2013], pp. 1-15. Retrieved from the Internet: http://www3.nd.edu/~csesoft/tech_reports/.*

Vincent, Luc., "Morphological Grayscale Reconstruction in Image Analysis: Applications and Efficient Algorithms," IEEE Transactions on Image Processing, Apr. 1993, pp. 176-201, vol. 2, No. 2, Piscataway, NJ.

Viola, Paul et al., "Rapid Object Detection Using a Boosted Cascade of Simple Features," Proceedings of IEEE Conference on Computer Vision and Pattern Recognition, Dec. 2001, pp. 1-511-1-518, vol. 1.

Nanda, Harsh, et al., "A Robust Elliptical Head Tracker," Sixth IEEE International Conference on Automatic Face and Gesture Recognition, May 17-19, 2004, IEEE Computer Society, pp. 469-474.

Toyama, Kentaro, et al., "Probabilistic Tracking in a Metric Space," Eighth International Conference on Computer Vision, Vancouver, Canada, vol. 2, Jul. 2001, 8 pages.

Bhat et al., Stereo in the Presence of Specular Reflection, Jun. 20-23, 1995, Proceedings., Fifth International Conference on Computer Vision, 1995, pp. 1086-1092.

Office Action dated Jun. 15, 2011, U.S. Appl. No. 12/044,981, filed Mar. 9, 2008.

Response to Office Action dated Aug. 5, 2011, U.S. Appl. No. 12/044,981, filed Mar. 9, 2008.

Notice of Allowance and Fee(s) Due dated Oct. 20, 2011, U.S. Appl. No. 12/044,981, filed Mar. 9, 2008.

* cited by examiner

IDENTIFICATION OF OBJECTS IN A 3D VIDEO USING NON/OVER REFLECTIVE CLOTHING

CROSS-REFERENCE TO RELATED APPLICATIONS

This is a continuation of U.S. patent application Ser. No. 12/044,981, filed Mar. 9, 2008, published as US 2009/0226079 on Sep. 10, 2009 and issued as U.S. Pat. No. 8,121,351 on Feb. 21, 2012, incorporated herein by reference.

FIELD OF THE INVENTION

The present invention relates to three dimensional (3D) imaging generally and to depth maps in particular.

BACKGROUND 3D imaging is known in the art. Several techniques are commonly used to create such images. U.S. Pat. No. 6,091,905, and U.S. Pat. No. 6,100,517, both assigned to the common assignees of the present invention and incorporated herein by reference, disclose methods and systems for rapidly and easily determining the distance of various points in a scene. The disclosed methods and systems detect reflected radiation, such as infrared (IR) or near infrared (NIR) radiation, to create a depth map. It will be appreciated that further references in the specification to IR may be exemplary; NIR and/or other types of radiation may also be used.

FIGS. 1 and 2, to which reference is now made, illustrate a typical such system and its exemplary output. As shown in FIG. 1A, system 100 comprises an IR generator 10, an IR detector 20 and a compensator 30. FIG. 2 shows exemplary images produced by system 100.

In a typical implementation, IR generator 10 generates IR radiation 15 and directs it at a scene, including, for example, object 40. IR detector 20 detects the intensity of radiation 25 as reflected from object 40. In general, the greater the intensity, the closer the object. FIG. 2 shows an exemplary RGB image 41 A of object 40 and matching IR images 45 A.

The intensity of radiation 25 detected by IR detector 20 is a function of both the distance to object 40 and its reflective properties. Reflectivity is the fraction of incident radiation reflected by a surface. Some materials, such as glass or polished metal are highly reflective. Other materials, such as matt paint, have lower reflectivity. Therefore, the material of an object can affect the intensity of the images received by IR detector 20.

To compensate for different reflective properties, as disclosed in U.S. Pat. Nos. 6,091,905 and 6,100,517, IR radiation 15 comprises an alternating series of continuous and pulsed radiations. The resulting series of IR images 45 are forwarded to compensator 30 which processes them to compensate for the different reflective properties. Compensator 30 typically divides a grayscale value for the intensity of a pixel during the continuous radiation period by a grayscale value for the same pixel during the period of pulsed radiation, with the quotient between the two being inversely proportional to a calculated value for depth, i.e. $D=P/C$, where D represents depth, P represents the pixel intensity received during pulsed radiation, and C represents the pixel intensity received during continuous radiation. The higher the value for depth, the closer the object. Compensator 30 produces a series of depth maps 50 based on the input IR images 45. FIG. 2 shows an exemplary depth map 50 A corresponding to IR images 45 A.

SUMMARY

An object of the present invention is to improve upon the prior art.

There is therefore provided, in accordance with a preferred embodiment of the present invention, a method including generating a depth map from at least one image, detecting objects in the depth map, and identifying anomalies in the objects from the depth map.

Moreover, in accordance with a preferred embodiment of the present invention, the identifying includes calculating a depth difference by comparing depths of at least two regions in the objects, and determining that an anomaly exists where an absolute value of the depth difference exceeds a threshold.

Further, in accordance with a preferred embodiment of the present invention, the at least one image is a first image generated using continuous radiation and a second image of the same scene using pulsed radiation, and the identifying includes defining a depth threshold and a pixel intensity threshold, finding associated pixels of the first and second images which have intensities below a threshold in both images, and determining that an anomaly exists where a calculated difference between the intensity of the associated pixels is less than the pixel intensity threshold and a derived depth exceeds the depth threshold.

Further, in accordance with a preferred embodiment of the present invention, the anomalies are logical gaps in the objects whose pixel depths are less than those of pixels in at least one adjacent region of the object.

Additionally, in accordance with a preferred embodiment of the present invention, the anomalies are logical protrusions in the objects whose pixel depths are greater than those of pixels in at least one adjacent region of the object.

Moreover, in accordance with a preferred embodiment of the present invention, the method also includes compensating for the anomalies by replacing pixels associated with the anomalies with pixels of depth similar to that of at least one region adjacent to the anomaly, where the region is a part of the object.

Further, in accordance with a preferred embodiment of the present invention, the method also includes marking the anomalies and using the marked anomalies to identify future occurrences of the detected objects.

There is also provided, in accordance with a preferred embodiment of the present invention, a method including identifying at least one anomaly in an object in a depth map and using the at least one anomaly to identify future occurrences of the object.

Moreover, in accordance with a preferred embodiment of the present invention, the anomalies are logical gaps in the objects whose pixel depths are less than those of pixels in at least one adjacent region of the object.

Further, in accordance with a preferred embodiment of the present invention, the anomalies are caused by materials with lower reflective properties than those of other materials represented in the depth map.

Still further, in accordance with a preferred embodiment of the present invention, the anomalies are logical protrusions in the objects whose pixel depths are greater than those of pixels in at least one adjacent region of the object.

Additionally, in accordance with a preferred embodiment of the present invention, the anomalies are caused by materials with greater reflective properties than those of other materials represented in the depth map.

Moreover, in accordance with a preferred embodiment of the present invention, the method also includes performing the identifying as part of a calibration process prior to operation.

Further, in accordance with a preferred embodiment of the present invention, the object is a part of a subject's body.

Still further, in accordance with a preferred embodiment of the present invention, the at least one anomaly is caused by a contrast in reflectivity between at least two parts of the subject's body.

Moreover, in accordance with a preferred embodiment of the present invention, the using includes distinguishing between said object and a second similar object.

Further, in accordance with a preferred embodiment of the present invention, the object and the similar object are a pair of objects. One of the pair of objects is identified as a left object and one of the pair of objects is a right object.

Moreover, in accordance with a preferred embodiment of the present invention, the method also includes marking the object as a specific individual.

Additionally, in accordance with a preferred embodiment of the present invention, the method also includes compensating for said anomalies by replacing pixels associated with the anomalies with pixels of depth similar to that of at least one region adjacent to the anomaly, where the region is a part of the object.

There is also provided, in accordance with a preferred embodiment of the present invention, a system including a three dimensional (3D) imaging system to generate a depth map from at least one image, an object detector to detect objects within the depth map, and an anomaly detector to detect anomalies in the detected objects, where the anomalies are at least one of a logical gap and a logical protrusion in the depth map.

Moreover, in accordance with a preferred embodiment of the present invention, the 3D imaging system includes means to process images generated from both pulsed and continuous radiation, and the anomaly detector includes means to compare pixel intensities from associated regions of the associated images to detect anomalies when a depth of the pixels is closer than a threshold.

Further, in accordance with a preferred embodiment of the present invention, the anomaly detector includes means to compare a difference in pixel depth between at least two regions of the detected objects.

Still further, in accordance with a preferred embodiment of the present invention, the system also includes an anomaly detector to generate a modified version of the depth map without the detected anomalies.

Additionally, in accordance with a preferred embodiment of the present invention, the system also includes an anomaly marker to mark the detected anomalies and associate them with the detected objects.

Moreover, in accordance with a preferred embodiment of the present invention, the object detector also includes means to use the marked anomalies to detect and identify the associated objects.

Further, in accordance with a preferred embodiment of the present invention, the anomaly marker includes a unit to associate the detected anomaly as representing a specific individual subject.

Still further, in accordance with a preferred embodiment of the present invention, the individual subject is a participant in a multiplayer application.

Moreover, in accordance with a preferred embodiment of the present invention, the object detector also includes a unit to use the marked anomalies to identify an individual subject in an application with multiple participants.

There is also provided, in accordance with a preferred embodiment of the present invention, a method including analyzing reflective properties of at least one object represented in a depth map, wherein the at least one object is at least one of a part of a subject's body and an object on the subject's body, marking anomalies caused by differences in the reflective properties and identifying future occurrences of the at least one object based on the marked anomalies.

Further, in accordance with a preferred embodiment of the present invention, the method also includes using the marked anomalies to distinguish between left and right paired objects, wherein the at least one object is one of the paired objects.

Still further, in accordance with a preferred embodiment of the present invention, the method also includes using the marked anomalies to distinguish between players of a multiplayer game.

Finally, in accordance with a preferred embodiment of the present invention, the at least one object is clothing, a clothing accessory, a part of a subject's body, jewelry or a medical artifact.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
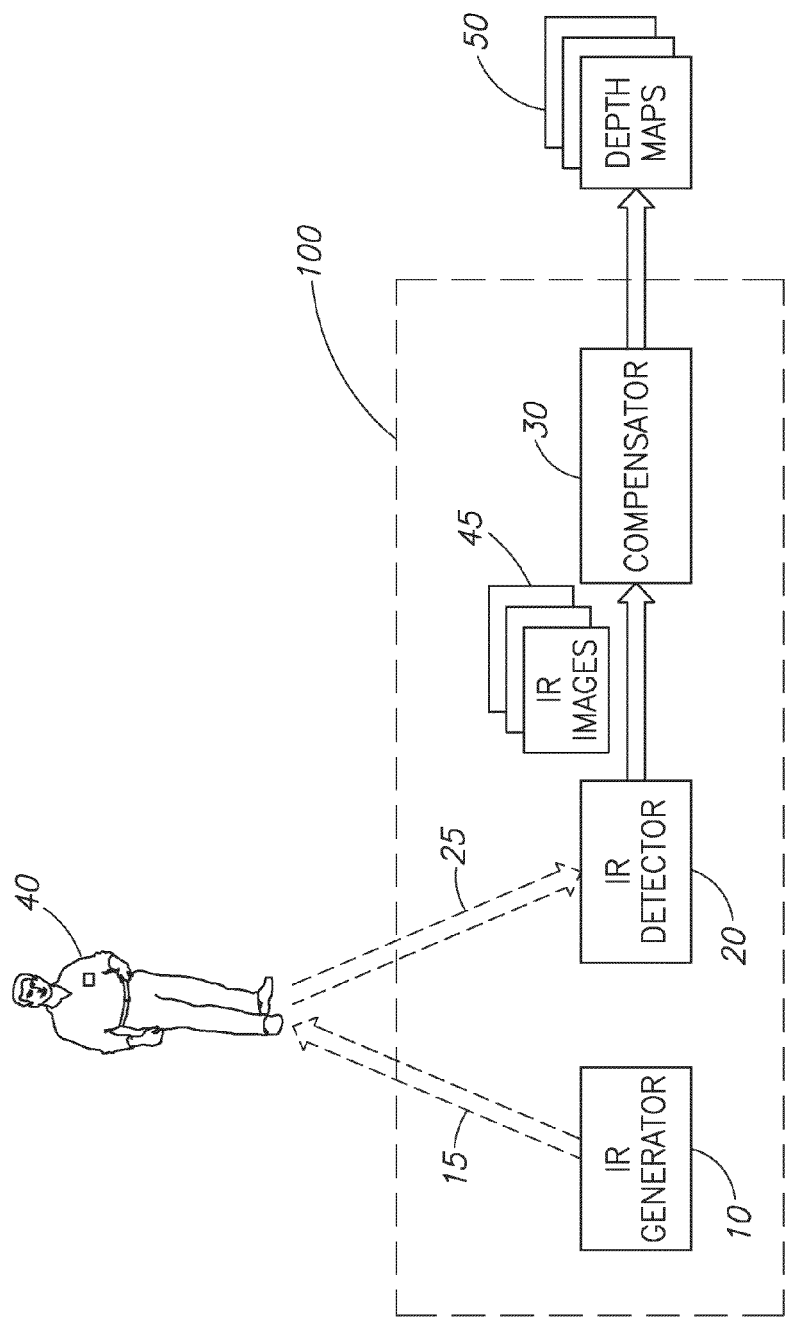
FIG. 1 is a schematic illustration of the operation of a prior art, three-dimensional (3D) camera.
Figure 2:
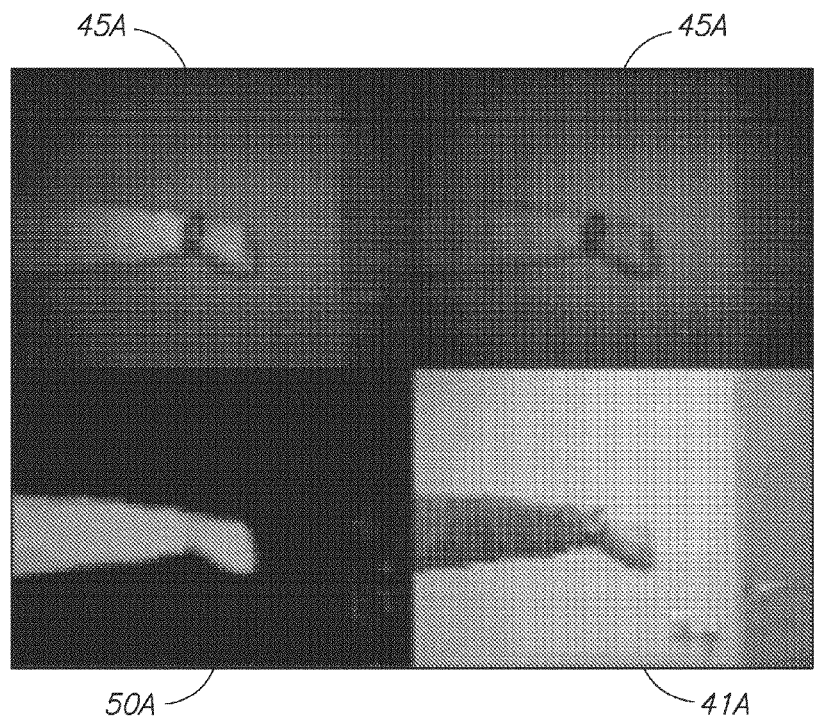
FIG. 2 is an illustration of exemplary output of elements of the 3D camera of FIG. 1.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that system 100 may not always properly compensate for the differing reflective properties of every object in a scene. Objects with generally different reflective properties may cause anomalies in the representation of depth in depth maps produced by system 100.

Figure 3:
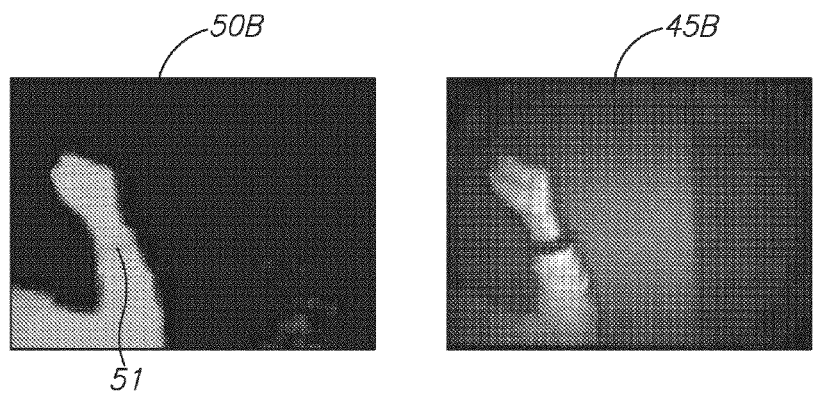
FIG. 3 is an illustration of IR image and a depth map of an arm with a wristwatch.

For example, a dark leather wristband may reflect relatively little radiation in comparison with a person's arm and/or hand and compensator 30 may not successfully handle this. FIG. 3, to which reference is now made, shows an exemplary IR image 45 B of an arm with a wristwatch. When processed by compensator 30, there may be a logical "gap" 51 where the wristwatch should be located in the representation of depth map 50 B. While the wristwatch area is still shown in depth map 50 B, the resulting lower pixel intensity in gap 51 appears to indicate that the wrist is actually farther away than the hand or arm. Depending on the materials used, it may even appear that the hand and arm are disconnected.

It will be appreciated that other types of material may result in other types of anomalies in the representation of depth map 50 B. For example, a highly reflective material, such as a shiny wristwatch with a metallic band, may result in an artificial protrusion in depth 50 B. Such a wristwatch may be represented as being much closer than it actually is.

Such anomalies may be assumed to be persistent during a given series of or session of depth maps. For example, if a subject may be wearing a wristwatch at the beginning of a session, it may generally be expected that the subject will continue to wear the wristwatch on the same arm for the duration of the session. Accordingly, Applicants have realized that such anomalies may be used to "tag" an object once it has been detected and identified. For example, a particular anomaly, such as one caused by a wristwatch, may be identified as associated with a right arm. Whenever the particular anomaly is observed it may therefore be assumed to be part of a right arm, without the need to establish and/or confirm that assumption via other methods.

Figure 4:
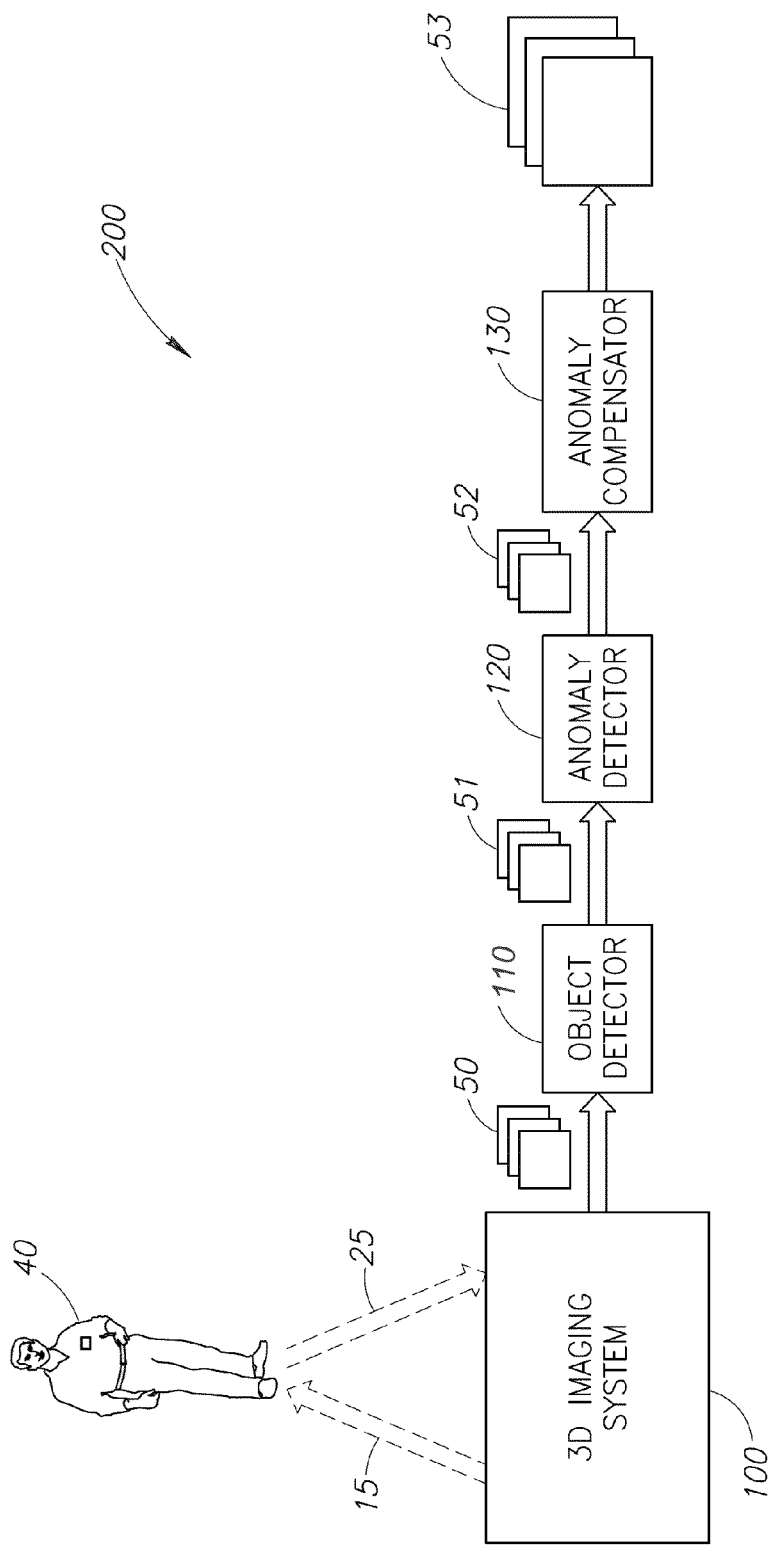
FIG. 4 is a schematic illustration of a novel system for detecting and compensating for anomalies in depth maps, constructed and operative in accordance with a preferred embodiment of the present invention.

It may also be advantageous to compensate for such anomalies when generating and/or displaying depth maps. FIG. 4, to which reference is now made, illustrates a novel system 200 for detecting and compensating for anomalies in depth maps. System 200 is designed and operative in accordance with a preferred embodiment of the present invention and may comprise 3D imaging system 100, an object detector 110, an anomaly detector 120 and an anomaly compensator 130.

Object detector 110 may receive depth maps 50 from imaging system 100 and may process them to detect identifiable objects, such as, for example, arms and legs.

It will be appreciated that object identifiers are known in the art. Accordingly, object identifier 110 may be implemented using a commercially available object identifier capable of identifying objects from a 2D image, such as, for example, the HAAR classifier, as disclosed in the article Rapid Object Detection using a Boosted Cascade of Simple Features, by Paul Viola and Michael Jones. Object identifier 110 may also be based on the Fujimura elliptical head tracker as disclosed in A Robust Elliptical Head Tracker, by Harsh Nanda and Kikuo Fujimura.

Object detector 110 may forward object identified images 51 to anomaly detector 120. Anomaly detector 120 may inspect the depth pixels of an identified object to detect regions with relatively abrupt changes in depth. For the purposes of this inspection, a pixel depth difference may be defined as the absolute value of the difference in depth between adjacent pixels or groups of pixels in the identified object. A threshold may be defined for a reasonable pixel depth difference to be expected from adjacent pixels or groups of pixels. It will be appreciated that by using an absolute value for the pixel depth difference, the same threshold may be used to detect both anomalous gaps and protrusions.

In accordance with an exemplary embodiment of the present invention, an 8-bit integer may be used to define a grayscale range to measure pixel depth, with values between 0 and 255. An exemplary threshold may be defined as a value of 50. Exceeding this threshold may indicate that there may be an anomaly in the object's representation caused by the different reflective properties of the area in question.

Figure 5:
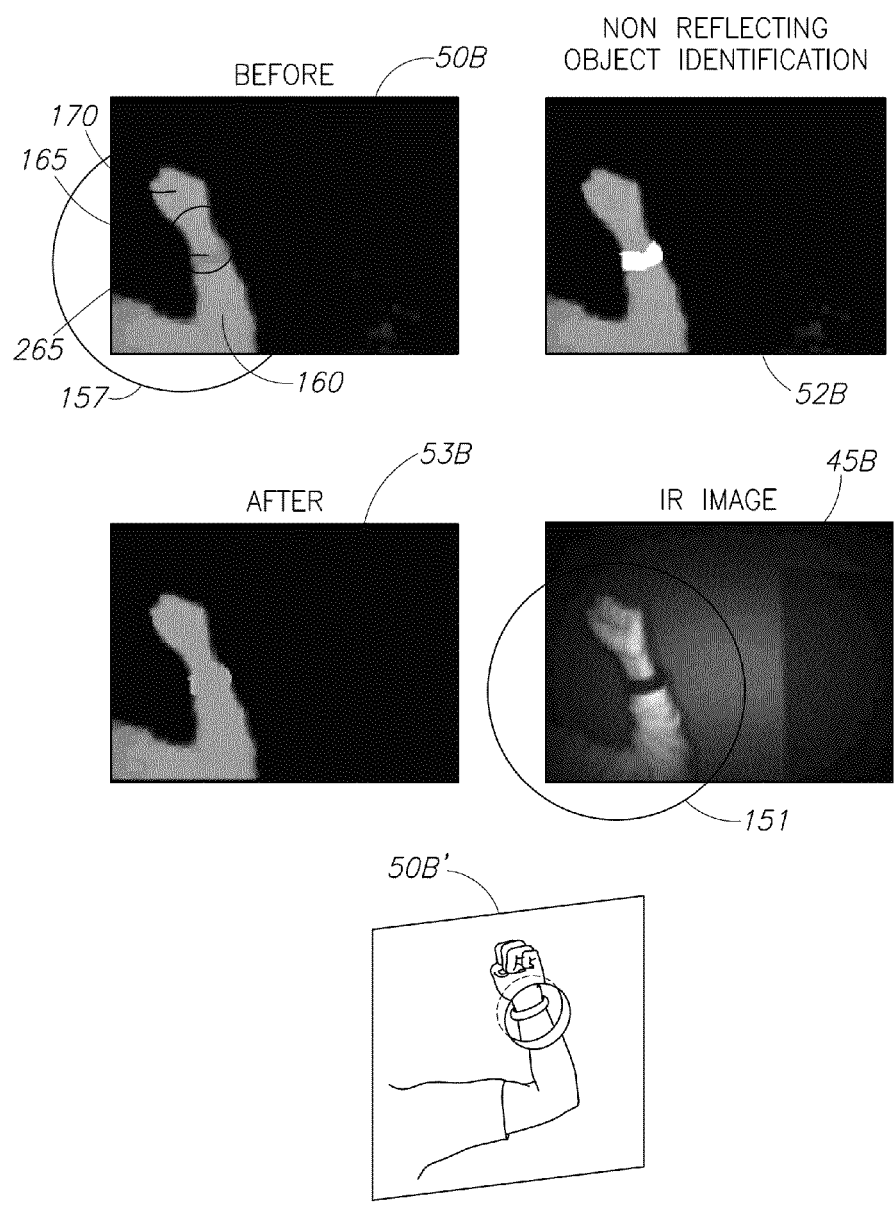
FIG. 5 is an illustration of images based on the images of FIG. 3.

FIG. 5, to which reference is now briefly made, shows images based on the images of FIG. 3. IR image 45 B and depth map 50 B together illustrate an exemplary arm object 151 as detected by object detector 110. 3D image 50 B' represents a 3D rendering of arm object 151 in accordance with the depth shown in depth map 50 B. Arm object 151 may comprise an upper arm area 160, a wrist area 165 and a hand area 170. Wrist area 165 as depicted in depth map 50 B may represent pixels of a lesser depth caused by a leather wristwatch or bracelet. It will be appreciated that the lesser depth of the pixels in wrist area 165 may have an anomalous effect on a 3D visualization of arm object 151. For example, as shown in 3D image 50 B', it may appear that wrist area 165 may be recessed or even fully disconnected from the rest of arm object 151.

Returning to FIG. 4, gap detector 120 may methodically inspect the pixels or groups of pixels in upper arm area 160 (FIG. 5A), repeatedly checking whether or not a calculated pixel depth difference is lower or greater than the defined threshold. When anomaly detector 120 begins inspecting wrist area 165 it may detect that the calculated pixel depth difference may exceed the defined threshold, thus indicating that an anomaly may be starting.

As anomaly detector 120 continues checking the pixels of wrist area 165, the pixel depth difference may fall below the defined threshold, thus indicating a continuation of the gap. When gap detector 120 may begin inspecting pixels or groups of pixels in hand area 170, the depth detected by anomaly detector 120 may once again exceed the defined threshold, thus indicating an end of the anomaly. In such manner, anomaly detector 120 may methodically inspect all of the area included in arm object 151 in order to fully map gap 265 in wrist area 165.

In accordance with an alternative embodiment of the present invention, anomalies may also be detected by analysis of individual pixels without comparing them to other pixels or regions of pixels in an object. As disclosed in U.S. Pat. Nos. 6,091,905 and 6,100,517, compensator 30 (FIG. 1) may divide the value of pixel intensity from continuous radiation by the value of pixel intensity from pulsed radiation to derive a compensated value for depth. It will be appreciated that, when the pixel intensity values are low, any noise is intensified by the division. This is particularly acute when the pixel values from the two types of radiation also have values close to each other, resulting in depth values close to the camera. These depth values may be anomalous. Thus, anomaly detector 120 may also use IR images 45 to detect anomalies in an associated depth map 50. If the pixel intensities in the two input images 45 (from both pulsed and continuous radiation) are both low and similar to each other, anomaly detector 120 may indicate an anomaly in the associated region of the derived depth map 50.

Returning to FIG. 5, gap identified depth map 52 B represents an exemplary output by gap detector 120: a depth map of arm object 151 with an anomalous gap 265 marked in white. Gap compensator 130 (FIG. 4) may receive arm object 151 for processing.

Gap compensator 130 may use any suitable "inpainting" method to process gap 265. Inpainting methods may generally use the properties of a region's boundaries to fill in gaps or repaint part or all of a region. An exemplary implementation of inpainting may be the "roifill" function in Matlab, commercially available from The MathWorks in the United States. Roifill may fill in a specified polygon in an image and may be used on depth maps. It may smoothly interpolate inward from the pixel values on the boundary of the polygon by solving a discrete differential equation.

In accordance with a preferred embodiment of the present invention, compensator 130 may perform a grayscale reconstruction as described in the article "Morphological Grayscale Reconstruction in Image Analysis: Applications and Efficient Algorithms" by Luc Vincent (IEEE Transactions on Image Processing, Vol. 2, No. 2, April 1993, pp 176-201). Anomaly compensator 130 may identify a pixel with the highest depth within arm object 151. Anomaly compensator 130 may then employ the identified pixel to impose a global maximum depth in order to produce a reconstructed version of arm object 151 as per the process as disclosed in the abovementioned article. Anomaly compensator 130 may fill-in gap 265 with pixels from a corresponding area in the reconstructed image.

Gap filled depth map 53 B illustrates an exemplary correction of gap identified image 52B. Gap 265 may be "filled in" and may generally blend in with the rest of arm object 151. It will be appreciated that the identification of an anomalous gap is exemplary. System 200 may also be used to identify and compensate for anomalous protrusions as well.

Figure 6:
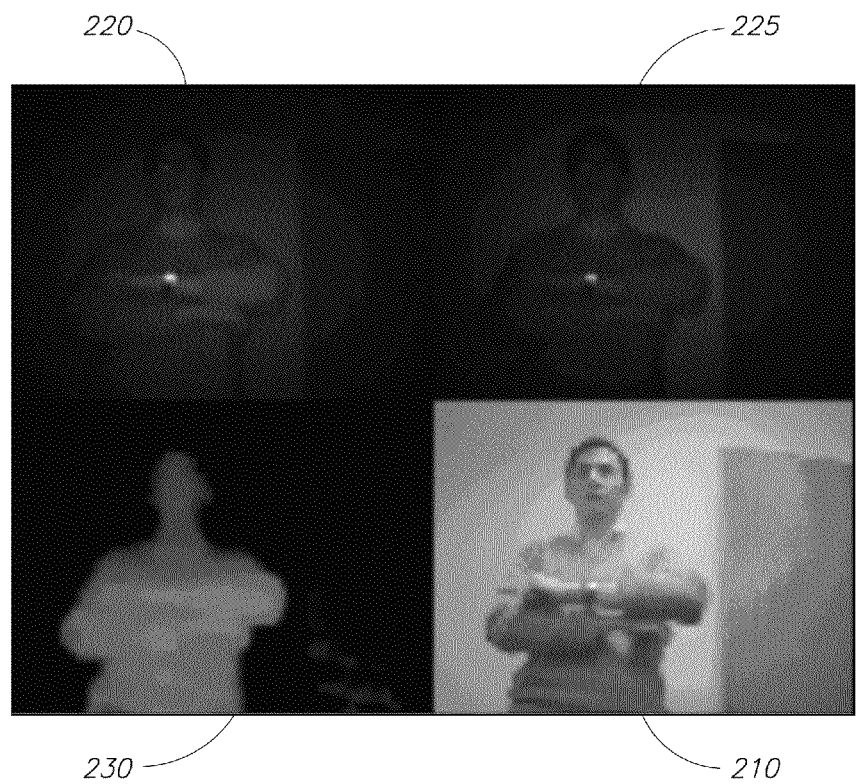
FIG. 6 is an illustration of images and depth maps of a scene with a man standing with his arms placed one on top of the other in front of him.

Reference is now made to FIG. 6. RGB image 210 shows a scene with a man standing with his arms placed one on top of the other in front of him. IR Images 220 and 225 represent the same scene. Depth map 230 may be the output of imaging system 200 generated by processing IR images 220 and 225.

It will be appreciated that it may more difficult to differentiate between the left and right hands of the man in depth map 230 than in images 220 and 225. It will further be appreciated that some 3D applications, for example interactive computer games, may require the capability to differentiate between left and right hands. Accordingly, it may be advantageous to provide a capability to identify and "mark" various body parts in a series of 3D images. Applicants have realized that that system 200 may be modified to provide such capability.

Figure 7:
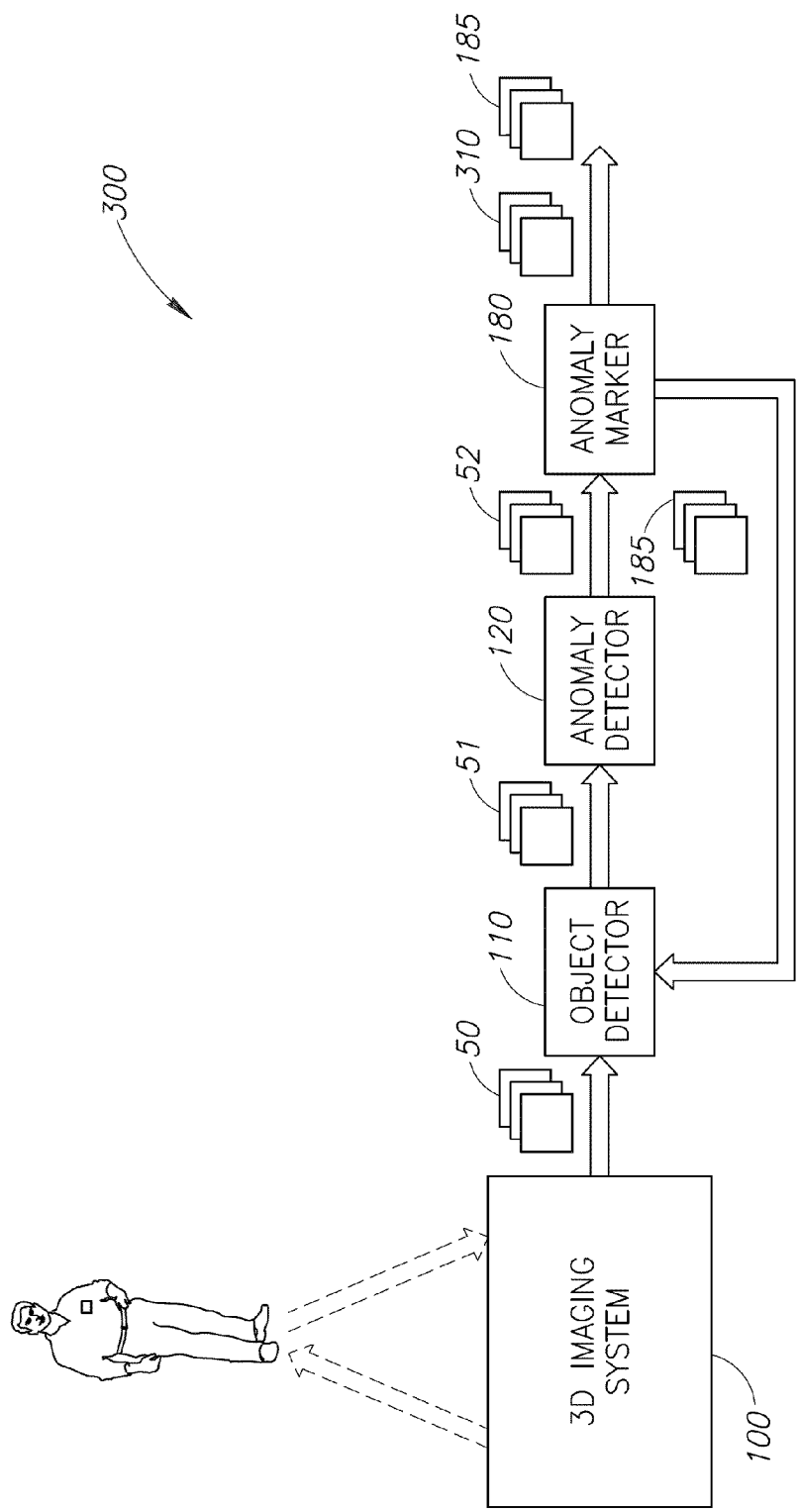
FIG. 7 is a schematic illustration of a novel system 300 for identifying and tagging body parts in a 3D image, constructed and operative in accordance with a preferred embodiment of the present invention.

Reference is now made to FIG. 7 which illustrates a novel system 300 for identifying and tagging body parts in a 3D image. System 300 may comprise 3D imaging system 100, object detector 110, anomaly detector 120 and an object marker 180.

As in the previous embodiment, object detector 110 may receive depth maps 50 from 3D imaging system 100 and may detect the objects therein. After processing depth maps 50, object detector 110 may forward the resulting object identified depth maps 51 to anomaly detector 120. Anomaly detector 120 may process depth maps 51 and may detect an anomalous gap as in the previous embodiment. Accordingly, as shown in anomaly identified depth map 52, anomaly detector 120 may identify a gap as specifically belonging to an object. For example, gap 265 may belong to a left arm.

In accordance with a preferred embodiment of the present invention, object marker 180 may receive anomaly identified depth maps 52 and may "mark" any identified anomalies as indicators for identified objects. For example, the size and shape of gap 265, as identified in FIG. 5, may be saved as a marker 185 identifying an object. If the object is known to be a left arm, then marker 185 identifies the arm as a left arm.

It will be appreciated that using marking gap 265 to mark an arm may be exemplary. Object marker 180 may be capable of using any anomaly detected by anomaly detector 120. For example, marker 180 may use an anomaly caused by highly reflective eyeglasses to mark a subject's eyes or head. Other highly reflective objects that may typically be used to identify specific parts of a subject's body may include, for example, jewelry and clothing accessories such as rings, bracelets, anklets, brooches, earrings, necklaces, belt buckles, buttons, and snaps. In addition to eyeglasses, other medical artifacts such as prosthetics, walking canes and braces may also be sufficiently reflective to generate anomalies.

It will also be appreciated that the present invention also includes using low reflective jewelry, medical artifacts, clothing and clothing accessories to identify specific parts of a subject's body. Object marker 180 may use anomalous gaps caused by low reflective objects in generally the same manner as anomalous protrusions caused by highly reflective objects.

It will further be appreciated that anomalies may even be caused by the differences in reflectivity of parts of a subject's body. For example, facial hair may tend to be less reflective than a subject's skin or clothing. Accordingly, a beard may be used to identify a subject's head or neck. Similarly, a mustache may be used to identify a subject's mouth, nose or head.

Markers 185 may be forwarded by object marker 180 to object detector 110. Object detector 110 may use markers 185 as additional templates for the identification of objects. It will be appreciated that once a marker 185 is identified, object detector 110 may then reliably identify a larger object that may encompass marker 185. For example, object detector 110 may use gap 265 to identify a left arm. Similarly, object detector 110 may use marked anomalous protrusions caused by the lenses of eyeglasses to identify a subject's eyes or head.

It will also be appreciated that system 300 may forward marked images 310 and/or markers 185 to other applications which may require generally precise identification of the objects in depth maps 50, 51, and 52.

In accordance with a preferred alternative embodiment of the present invention, users may undergo a calibration process when first using system 300. Such a process may comprise displaying body parts and/or other objects as per a script or in response to prompting. In such manner, an inventory of markers 185 and the objects to which they are associated may be acquired prior to operation of system 300 and may thus facilitate smoother and more efficient operation.

In accordance with a preferred embodiment of the present invention, system 300 may also be used in conjunction with a multiplayer game. In such games, it may be necessary to differentiate between the players based on analysis of their images as represented in depth maps. Applicants have realized that markers 185 may also be used to differentiate between two or more players.

A calibration process to identify and "mark" the players of such a game may be performed prior to the start of a multiplayer game. The players may be instructed to stand in specific poses such that their projections as perceived by system 100 may not overlap. Alternatively, they may be instructed to pose separately. System 300 may then detect anomalies in the individual players' projections as described hereinabove. For example, one player may have a non-reflecting beard and/or may be wearing highly reflective glasses. System 300 may mark such an anomaly as belonging to a specific player.

Such marked anomalies may be used as needed to distinguish between the players during the course of the game. For example, suppose that Player A may be wearing eyeglasses, whereas Player B may not. Since eyeglasses typically have high reflectivity, during calibration, they will be found in IR images as two peaks with a relatively large area (compared to a simple eye glare). System 300 may detect and mark them as an anomaly belonging to Player A. While the game is played object detector 110 detect similar peaks and distinguish them from other peaks of reflectivity that might be found due to eye glare of players that do not wear glasses. Player A may thus be distinguished from other players that may not have eyeglasses.

It will be appreciated that in addition to multiplayer games this embodiment may also include other applications with multiple participants.

It will also be appreciated that the use of marked anomalies as a means to identify objects and/or players may be used instead of, or in addition to, other means that may be available depending on the circumstances and requirements of a specific application of the present invention. For example, an individual subject may also be identified by height, size or some other feature or identifying characteristic. If for whatever reason the use of these identifiers may be problematic, a marked anomaly may be used instead.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computing system for processing images, comprising:
a 3-D imaging system, the 3-D imaging system generates at least one depth map from at least one image of a first person in an application during a calibration process of the application;
an object detector, the object detector identifies a body part of the first person in the at least one depth map;
an anomaly detector, the anomaly detector, responsive to the object detector, identifies, from the at least one depth map, an anomaly in the body part of the first person, the anomaly in the body part of the first person comprising:
(a) a logical gap anomaly which represents a first object of the body part of the first person appearing to be further from the 3-D imaging system than the first object actually is due to a lower reflective property of the first object, where the first object is identified by pixel depths which are less than pixel depths of an adjacent region of the first object or (b) a logical protrusion anomaly which represents the first object appearing to be closer to the 3-D imaging system than the first object actually is due to a higher reflective property of the first object, where the first object is identified by pixel depths which are greater than pixel depths of an adjacent region of the first object; and
an anomaly marker, the anomaly marker, responsive to the anomaly detector, generates a marker which identifies the anomaly in the body part of the first person, the anomaly marker forwards the marker which identifies the anomaly in the body part of the first person to the object detector and the object detector, in response to the anomaly marker, subsequently uses the marker which identifies the anomaly in the body part of the first person as a template to identify a future occurrence of the body part of the first person in a series of depth maps after the calibration process.

2. The computing system of claim 1, wherein:
the anomaly marker marks the anomaly in the body part of the first person by an indication of a size and shape of the anomaly in the body part of the first person.

3. The computing system of claim 1, wherein:
the application comprises a multiplayer application; and
the calibration process occurs prior to a start of the multiplayer application.

4. The computing system of claim 1, wherein:
the first object comprises hair of the body part of the first person and the body part comprises a head of the first person.

5. The computing system of claim 1, wherein:
the first object comprises an object worn on the body part of the first person and the body part comprises an arm or wrist of the first person.

6. The computing system of claim 1, wherein:
the anomaly in the body part of the first person is used to distinguish between left and right paired objects, and the first object is one object of a pair of objects.

7. The computing system of claim 1, wherein:
the first object comprises at least one of: clothing, a clothing accessory, a jewelry or a medical artifact worn on the body part.

8. The computing system of claim 1, wherein the anomaly detector, to identify the anomaly in the body part of the first person:
calculates a depth difference by a comparison of depths of at least two regions in the body part of the first person; and
determines that an anomaly exists where an absolute value of the depth difference exceeds a threshold.

9. The computing system of claim 1, further comprising:
an anomaly compensator, the anomaly compensator compensates for the anomaly in the body part of the first person by a replacement of pixels associated with the anomaly in the body part of first person with pixels of depth similar to that of a region adjacent to the anomaly in the body part of first person.

10. The computing system of claim 1, wherein:
the at least one image comprises a first image of a scene generated using continuous radiation;
a second image of the scene is generated using pulsed radiation; and
the anomaly detector, to identify the anomaly in the body part of the first person:
  finds associated pixels of the first and second images which have intensities below a threshold;
  calculates differences between the intensities of the associated pixels in the first and second images; and
  determines that an anomaly exists in response to a determination that the calculated differences are less than a pixel intensity threshold.

11. The computing system of claim 10, wherein the anomaly detector, to identify the anomaly in the body part of the first person:
  derives compensated depth values by a division of the intensities of the first image by the intensities of the second image;
  determines that the compensated depth values exceed a depth threshold; and
  determines that an anomaly exists responsive to the determination that the compensated depth values exceed the depth threshold.

12. The computing system of claim 1, wherein:
the at least one image comprises a second person in the application during the calibration process of the application;
the object detector identifies a body part of the second person in the at least one depth map;
the anomaly detector, responsive to the object detector, identifies, from the at least one depth map, an anomaly in the body part of the second person, the anomaly in the body part of the second person comprising: (a) a logical gap anomaly which represents a second object of the body part of the second person appearing to be further from a 3-D imaging system than the second object actually is due to a lower reflective property of the second object, where the second object is identified by pixel depths which are less than pixel depths of an adjacent region of the second object or (b) a logical protrusion anomaly which represents the second object appearing to be closer to the 3-D imaging system than the second object actually is due to a higher reflective property of the second object, where the second object is identified by pixel depths which are greater than pixel depths of an adjacent region of the second object; and
the anomaly marker, responsive to the anomaly detector, provides a marker which identifies the anomaly in the body part of the second person, the object detector uses the marker which identifies the anomaly in the body part of the second person as a template to identify a future occurrence of the body part of the second person in the series of depth maps and to differentiate between the first and second persons.

13. A method for processing images, comprising:
performing a calibration process prior to a start of an application, the performing the calibration process comprises:
  generating at least one depth map from at least one image of a first person;
  detecting a body part of the first person in the at least one depth map;
  identifying, from the at least one depth map, responsive to the detecting, an anomaly in the body part of the first person, the anomaly in the body part of the first person comprising: (a) a logical gap anomaly which represents a first object of the body part of the first person appearing to be further from the 3-D imaging system than the first object actually is due to a lower reflective property of the first object, where the first object is identified by pixel depths which are less than pixel depths of an adjacent region of the first object or (b) a logical protrusion anomaly which represents the first object appearing to be closer to the 3-D imaging system than the first object actually is due to a higher reflective property of the first object, where the first object is identified by pixel depths which are greater than pixel depths of an adjacent region of the first object;
  responsive to the identifying, generating a marker which identifies the anomaly in the body part of the first person; and
  forwarding the marker which identifies the anomaly in the body part of the first person to an object detector; and
after the performing the calibration process, during the application and at the object detector: using the marker which identifies the anomaly in the body part of the first person as template, identifying a future occurrence of the body part of the first person in a series of depth maps.

14. The method of claim 13, wherein:
the marker which identifies the anomaly in the body part of the first person comprises an indication of a size and shape of the anomaly in the body part of the first person.

15. The method of claim 13, wherein:
the application comprises a multiplayer application.

16. The method of claim 13, wherein:
the performing the calibration process comprises prompting the first person to stand in a specific pose or to display the body part.

17. The method of claim 13, wherein:
the performing the calibration process further comprises:
  detecting a body part of a second person in the at least one depth map;
  identifying, from the at least one depth map, an anomaly in the body part of the second person, the anomaly in the body part of the second person comprising: (a) a logical gap anomaly which represents a second object of the body part of the second person appearing to be further from the 3-D imaging system than the second object actually is due to a lower reflective property of the second object, where the second object is identified by pixel depths which are less than pixel depths of an adjacent region of the second object or (b) a logical protrusion anomaly which represents the second object appearing to be closer to the 3-D imaging system than the second object actually is due to a higher reflective property of the second object, where the second object is identified by pixel depths which are greater than pixel depths of an adjacent region of the second object; and
  responsive to the identifying of the anomaly in the body part of the second person, providing a marker which identifies the anomaly in the body part of the second person; and
after the performing the calibration process, during the application: using the marker which identifies the anomaly in the body part of the second person as a template, identifying a future occurrence of the body part of the second person and differentiating between the body part of the first person and the body part of the second person, in the series of depth maps.

18. The method of claim 17, further comprising:
the performing the calibration process comprises prompting the first and second persons to stand in specific poses in which their projections as perceived by the 3-D imaging system do not overlap.

19. A computing system for processing images, comprising:
- a 3-D imaging system, the 3-D imaging system generates at least one depth map from at least one image of first and second persons in a multiplayer application during a calibration process of the multiplayer application;
- an object detector, the object detector identifies a body part of the first person and a body part of the second person in the at least one depth map;
- an anomaly detector, the anomaly detector, responsive to the object detector, identifies, from the at least one depth map, an anomaly in the body part of the first person and an anomaly in the body part of the second person, the anomaly in the body part of the first person comprising a logical gap anomaly or a logical protrusion anomaly, and the anomaly in the body part of the second person comprising the logical gap anomaly or the logical protrusion anomaly; and
- an anomaly marker, the anomaly marker, responsive to the anomaly detector, generates a marker which identifies the anomaly in the body part of the first person and a marker which identifies the anomaly in the body part of the second person, the object detector uses the marker which identifies the anomaly in the body part of the first person and the marker which identifies the anomaly in the body part of the second person to differentiate between the body part of the first person and the body part of the second person in future occurrences of the body part of the first person and the body part of the second person in a series of depth maps, after the calibration process.

20. The computing system of claim 19, wherein:
the anomaly in the body part of the first person represents a first object of the body part of the first person appearing to be further from the 3-D imaging system than the first object actually is due to a lower reflective property of the first object, where the first object is identified by pixel depths which are less than pixel depths of an adjacent region of the first object or the first object appearing to be closer to the 3-D imaging system than the first object actually is due to a higher reflective property of the first object, where the first object is identified by pixel depths which are greater than pixel depths of an adjacent region of the first object; and
the anomaly in the body part of the second person represents a second object of the body part of the second person appearing to be further from the 3-D imaging system than the second object actually is due to a lower reflective property of the second object, where the second object is identified by pixel depths which are less than pixel depths of an adjacent region of the second object or the second object appearing to be closer to the 3-D imaging system than the second object actually is due to a higher reflective property of the second object, where the second object is identified by pixel depths which are greater than pixel depths of an adjacent region of the second object.

* * * * *